United States Patent Office 3,544,345
Patented Dec. 1, 1970

3,544,345
METHOD OF MAKING A DRIED STARCH-ENZYME BLEND
Edwin Lawrence Speakman, Clinton, Iowa, assignor to Standard Brands Incorporated, New York, N.Y., a corporation of Delaware
No Drawing. Filed Jan. 2, 1968, Ser. No. 694,881
Int. Cl. C13l 1/08; C08b 27/14; C09j 3/18
U.S. Cl. 106—157    7 Claims

ABSTRACT OF THE DISCLOSURE

A starch liquefying enzyme is incorporated into a starch slurry, the slurry dewatered and the dewatered starch blend dried at temperatures in the range of 160° to 250° F. This dried starch product can be used for preparing starch adhesives.

---

This invention relates to a method of producing a dried starch product. Particularly, the present invention relates to a method of producing a dried starch product which may be converted economically and conveniently into a starch adhesive.

Starch adhesives are used for a variety of purposes in the paper industry. For instance, they may be used as adhesives in joining two or more paper sheets together to form laminated or corrugated boards or used to manufacture various kinds of boxes, bags, envelopes, cartons, and other containers.

In the manufacture of paper, starch adhesives may be used as sizing. Sizing of paper, depending upon the nature of the paper and the use to which it is to be put, is accomplished in one or more of the stages in the manufacture of the paper. For instance, starch size may be added to the pulp at the beaters before the paper sheet is formed or it may be used as a so-called surface size, for example, tub sizing. When it is desired to produce sheets of paper in which clay or other pigments are incorporated, these sheets are sometimes sized with starch.

In the preparation of starch size, starch is suspended in water and cooked under suitable conditions to form a paste of starch with the desired adhesive properties. Because the viscosity of such a paste is undesirably high for most applications, the starch paste is thinned by a starch liquedfying enzyme before being applied to paper. Also, in some instances, the starch which is to be used as a sizing is modified in order to provide a starch which will liquefy more readily and/or more uniformly than ordinary, unmodified starch or which will require the use of less enzyme to obtain the desired degree of liquefaction.

The liquefying enzyme used in the preparation of starch size is generally supplied to the user in a concentrated dry form. Concentrating and drying enzymes result in some loss of the activity of the enzymes.

In order to promote more convenient preparation of starch size, there has been proposed mixing a starch liquefying enzyme with starch before the starch is used as a sizing. United States Patents 2,364,590 and 1,677,615 disclose various methods to accomplish this end. In both of these patents, the enzyme is mixed with either wet starch, for instance, starch with a moisture content of 45 to 55 percent, or with starch which has been dried to low moisture levels. When the enzyme is mixed with wet starch, these patents prescribe drying the starch-enzyme mixture at extremely low temperatures, for instance, temperatures not exceeding 160° F. or at temperatures encountered in vacuum drying.

It is an object of the present invention to provide a method of incorporating a starch liquefying enzyme into starch whereby such mixture may be dried at elevated temperatures without significant loss of enzyme activity being observed, thereby producing a starch product which may be used as an adhesive.

This object and others, which will be apparent from the following description, are achieved by incorporating into a water slurry of starch a starch liquefying enzyme, dewatering the starch-enzyme slurry and drying the dewatered starch-enzyme blend at elevated temperatures.

The term "starch" is defined herein as any starch which when subjected to cooking forms an adhesive and can b enzyme-liquefied, and includes such starches as corn, milo, wheat, potato, tapioca, and the like, derivatives of starch, and starches which have been modified by acid hydrolysis or by oxidation, for instance, treating with hypochlorous acid and/or hypochlorite solutions.

The liquefying enzyme incorporated into the starch slurry may be in an aqueous preparation or in a dry, concentrated form. In the method of the present invention it is particularly desirable to use bacterial alpha-amylase. When bacterial alpha-amylase is used, it has been found that the enzyme in the dried starch product is exceedingly stable.

The starch-enzyme blend may be prepared by simply mixing the enzyme with a starch slurry. Typically, the starch slurry is obtained directly from a wet starch milling operation and will contain between about 57 and about 75 percent water. This starch slurry may then be filtered, for instance, and then dried.

In practicing the process of the present invention dilute solutions of enzymes may be used. Typically, such solutions are those obtained from an enzyme manufacturing process before concentration of the enzyme solution as for instance by evaporation procedures.

The starch-enzyme slurry may be dewatered by conventional means, such as by vacuum filtration. After dewatering, the wet starch-enzyme blend may be charged into a conventional starch dryer and dried to normal dry starch moisture levels, i.e., about 10 to about 14 percent moisture.

Although it has not been found critical to adjust the pH of the starch slurry before the enzyme is incorporated therein, there appears to be a practical pH range within which the slurry should be maintained. The lower limit appears to be about 4 and the higher pH limit appears to be about 12. At a pH level lower than about 4, the enzyme will lose at least a portion of its activity, and at a pH higher than 12, the starch upon drying will be somewhat discolored. The preferred pH range of the starch slurry is between about 5 and about 9.

The dewatered starch-enzyme blend may be dried in conventional starch dryers and at temperatures commonly encountered in starch drying. When the starch-enzyme slurry is at a pH of about 6 and a dewatered starch-enzyme blend is prepared therefrom, air drying temperatures from about 160° to 250° F. have provided satisfactory results. An air drying temperature of about 200° F. has provided the most satisfactory starch-enzyme blend.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are utilized to refer to percent by weight, unless otherwise specified.

The term "liquefon" used in the following description is defined as the amount of enzyme which will dextrinize 2.85 mg. of starch under specific conditions and is calculated using the following formula:

$$\text{Liquefons/g.} = \frac{1140}{\text{Weight (g.) of enzyme} \times \text{time (min.)}}$$

The method used is a modification of that adopted by the American Association of Textile Chemists (AATC) published in the American Dyestuff Reporter, July 9, 1962. The modifications of the published method are as follows:

(1) The buffer for the substrate was prepared by dissolving 25.3 grams of C.P. sodium hydroxide and 340 g. of potassium dihydrogen phosphate in water and diluting to 2 liters. The pH of the buffer was 6.2, (2) 125 ml. of the buffer was added to the substrate before the substrate was brought to the necessary volume, and (3) 20 ml. of the substrate and 10 ml. of the enzyme solution were used per determination.

The viscosities given in the examples are in centipoises and were obtained by the use of a Brookfield Model HAT viscometer. The viscosities were measured at 20 r.p.m. and at a temperature of 140° F. Number 1 and 2 spindles were used, Number 1 for viscosities below about 1,000 cps. and Number 2 for viscosities above about 1,000 cps.

EXAMPLE I

An untreated cornstarch slurry was diluted to 28.43 percent starch on a dry weight basis, and 40 liters of this slurry at 88° F. were placed in a tank equipped with an agitator. The pH of the slurry was adjusted to 6.3 using a 2 percent by weight sodium hydroxide solution. Sufficient alpha-amylase solution was added to provide an enzyme activity of 18 liquefons per gram of starch on a dry weight basis. The amylase solution was an unrefined filtrate from a *B. subtilis* fermentation. The slurry was stirred for about 30 minutes to insure thorough mixing, sieved through a screen of approximately 200 mesh U.S. Standard, and filtered on a Buchner funnel under vacuum. The unwashed filter cake was broken into small pieces and dried in a laboratory model Proctor & Schwartz forced air flow dryer at an air temperature of 180° F. This product was evaluated for its enzyme activity content by suspending a portion of it in water at 70° F. to obtain 3,000 grams of slurry containing 18 percent starch on a dry weight basis. After adjusting the pH to 6.5 with dilute sodium hydroxide solution, the starch was liquefied by heating the slurry from 70° F. to 160° F. in 20 minutes, holding at 160° F. for 5 minutes, then heating to 172° F. in 5 minutes and holding at this temperature for 20 minutes. The enzyme was inactivated by raising the temperature of the liquefied starch to a temperature in the range of 200° to 210° F. The viscosity at the end of the liquefaction was 620 cps. and after the enzyme was inactivated 27 cps.

Because of the large amount of water in the starch-enzyme slurry and subsequent removal of approximately two thirds of the same by filtration, it was anticipated that only about one third or less of the quantity of the enzyme added to the slurry would be retained in the starch cake. However, the low viscosities obtained after liquefaction indicated that a significantly greater amount of enzyme was retained.

EXAMPLE II

A suspension of untreated cornstarch was prepared as described in Example I, 18 liquefons of enzyme activity were added per gram of starch on a dry weight basis, and the pH of the slurry was adjusted to 6 using dilute hydrochloric acid. The slurry, at ambient temperature, was filtered without washing and then broken into small pieces. One half of the wet cake was set aside to be used as a control. The remainder of the cake was dried in a laboratory model Proctor & Schwartz forced air flow dryer at an air temperature of about 200° F. The wet cake control and the dried cake were suspended separately in water to 18 percent by weight solids concentration, and the starch liquefied as described in Example I. The viscosity at the end of the liquefaction cycle was 420 cps. for the wet cake control and 480 cps. for the dried sample. After the inactivation cycle the viscosity was 23 cps. for the wet cake control and 25 cps. for the dried sample. These differences are extremely small and demonstrate that the observable loss of enzyme activity due to the heat applied during drying it not significant.

EXAMPLE III

This example demonstrates the effect of holding a starch-enzyme slurry for various time intervals at different temperatures.

A slurry of untreated cornstarch was diluted to 28.43 percent starch solids on a dry weight basis and adjusted to a pH of 6.3. Six liters of this slurry were placed in each of six vessels equipped with agitators and covers. Three of the vessels were placed in a water bath controlled to maintain a high temperature of 120° F. The other vessels were left at room temperature, i.e., about 80° F. When constant temperatures were attained, 18 liquefons of enzyme activity per gram starch on a dry weight basis were added to each slurry. The enzyme used was in the form of an unrefined filtrate of a *B. subtilis* fermentation. At the end of 15 minutes, 2 hours, and 18 hours one slurry from the room temperature group and one from the high temperature group were sieved and filtered as described in Example I. The starch cakes were dried in a laboratory model Proctor & Schwartz dryer with forced air circulation at an air temperature of 200° F. Evaluation of the products for enzyme activity via the liquefying and inactivation procedure given in Example I gave the results shown in the following table.

TABLE 1

| | Low temperature (80° F.) | | | High temperature (120° F.) | | |
|---|---|---|---|---|---|---|
| | 15 min. | 2 hr. | 18 hr. | 15 min. | 2 hr. | 18 hr. |
| Viscosity, cps., end of conversion | 480 | 300 | 860 | 1,400 | 1,820 | (1) |
| Viscosity, cps., end of inactivation | 42 | 20 | 32 | 55 | 75 | (1) |

1 Too thick to flow.

From this it is evident that there are practical limits insofar as the time and temperature at which the starch-enzyme slurries may be held prior to dewatering the same and still achieve a reasonable conversion of the starch.

EXAMPLE IV

This example demonstrates the stability of the enzyme activity of the starch-enzyme blend prepared by the method of the present invention.

A portion of the dried starch-enzyme blend from Example I was placed in a polyethylene lined bag and stored under ambient conditions. The temperature during storage averaged about 75–80° F. Periodically, samples were taken from storage and evaluated for activity by suspending them in water to 18 percent solids, adjusting the pH to 6.5 with dilute caustic, and subjecting them to the liquefying and inactivation cycles described in Example I. The results of this test are described below.

TABLE 2

| | Viscosity | |
|---|---|---|
| | End of conversion, cps. | End of inactivation, cps. |
| Storage time, days: | | |
| 0 | 620 | 28 |
| 26 | 700 | 28 |
| 54 | 630 | 30 |
| 82 | 590 | 28 |
| 112 | 595 | 30 |
| 148 | 610 | 30 |
| 174 | 690 | 22 |
| 319 | 680 | 22 |

The essentially constant viscosities demonstrate that loss of enzyme activity on storing over at least 319 days was insignifficant.

EXAMPLE V

This example demonstrates the effect of varying the pH of starch-enzyme slurries on the activity of the enzyme prior to dewatering and drying. This example also demonstrates the effect of various air drying temperatures on the activity of the enzyme.

In this example, 12 liquefons of enzyme activity per gram of starch on a dry weight basis were incorporated into the starch slurry. The starch-enzyme slurries were treated exactly in the manner described in Example I, except where otherwise indicated in the following tables.

TABLE 3.—EFFECT OF DRYING TEMPERATURE
[Starting slurry pH of 6]

|  | pH of slurry of the dried starch-enzyme blend | pH adjusted prior to liquefication | Viscosity, cps. | |
|---|---|---|---|---|
|  |  |  | After liquefication | After inactivation |
| Air temp. ° F.: |  |  |  |  |
| 160 | 6.3 | 6.5 | 2,680 | 190 |
| 200 | 6.2 | 6.5 | 1,000 | 41 |
| 250 | 6.1 | 6.5 | 1,904 | 86 |

TABLE 4.—EFFECT OF SLURRY FINISH pH
[Starch-enzyme blend dried at 200° F., air temperature]

| pH of slurry prior to filtration | pH of slurry of the dried starch-enzyme blend | pH adjusted prior to liquefication | Viscosity, cps. | |
|---|---|---|---|---|
|  |  |  | After liquefication | After inactivation |
| 4.0 | 5.5 | 6.5 | (¹) | (¹) |
| 5.0 | 5.8 | 6.5 | 2,952 | 536 |
| 6.0 | 6.2 | 6.5 | 1,000 | 41 |
| 7.0 | 6.7 | 6.5 | 1,060 | 44 |
| 8.0 | 7.1, 7.5 | 6.5, 6.5 | 1,480, 2,120 | 75, 100 |
| 9.0 | 8.6 | 6.5 | 3,280 | 262 |
| 10.0 | 9.6 | 6.6 | 4,000 | 586 |
| 11.0 | 10.3 | 6.5 | 5,840 | 1,280 |
| 11.8 | 11.3 | 6.6 | (¹) | (¹) |

¹ Too thick to flow.

From Table 3, it is apparent that at drying temperatures in the range of about 200° F. minimum loss of enzyme activity occurs. Drying temperatures of about 160° F. and about 250° F. result in greater loss of enzyme activity but not to an impractical extent. The effect of drying temperatures on enzyme activity will vary somewhat depending upon the humidity and the velocity of the air and the bed depth of the starch in the dryer.

Table 4 shows that the pH of the starch-enzyme slurry may vary over a significant range, but a slurry pH between 6 and 8 appears to be preferred.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A process for producing a starch product suitable for preparing starch adhesives which comprises incorporating into a starch slurry containing between about 57 and 75 percent water an amount of bacterial alpha-amylase, dewatering the slurry by mechanical means, and drying the dewatered starch-enzyme blend at a temperature in the range of from about 180° to about 250° F. to low moisture levels without substantially inactivating the enzyme, the amount of bacterial alpha-amylase being sufficient to substantially completely liquefy the starch when the dried starch-enzyme blend is reconstituted in water and subjected to starch pasting conditions.

2. A process for producing a starch product suitable for preparing starch adhesives as defined in claim 1, wherein the starch is cornstarch and the pH of the slurry is maintained within the range of from about 4 to about 12.

3. A process for producing a starch product suitable for preparing starch adhesives as defined in claim 1, wherein the starch is cornstarch and the pH of the slurry is about 6.

4. A process for producing a starch product suitbale for preparing starch adhesives as defined in claim 1, wherein the starch-enzyme blend is dried to a moisture content of from about 10 to about 14 percent moisture.

5. A process for producing a starch product suitable for preparing starch adhesives as defined in claim 2, wherein the pH of the slurry is maintained within the pH range of from about 5 to about 9.

6. A process for producing a starch product suitable for preparing starch adhesives as defined in claim 5, wherein the starch-enzyme blend is dried at an air temperature of about 200° F.

7. A process for producing a starch product suitable for preparing starch adhesives as defined in claim 1, wherein the starch slurry containing the enzyme is maintained at a temperature of less than 120° F. for a period of less than 2 hours prior to dewatering the same.

References Cited

UNITED STATES PATENTS 1,677,615  11/1928  Boidin _____ 195—64
2,364,590  5/1944  Schopmeyer _____ 195—24

OTHER REFERENCES

Ralph Kerr: Chem. and Indust. of Starch, p. 429, 1952.

JULIUS FROME, Primary Examiner

A. H. KOECKERT, Assistant Examiner

U.S. Cl. X.R.

106—208; 127—33, 71; 195—24, 64